(12) United States Patent
Haulick et al.

(10) Patent No.: US 8,369,901 B2
(45) Date of Patent: Feb. 5, 2013

(54) HANDS-FREE TELEPHONY AND IN-VEHICLE COMMUNICATION

(75) Inventors: Tim Haulick, Blaubeuren (DE); Bernd Iser, Ulm (DE); Gerhard Schmidt, Ulm (DE); Arthur Wolf, Neu-Ulm (DE)

(73) Assignee: Nuance Communications, Inc., Burlington, MA (US)

( * ) Notice: Subject to any disclaimer, the term of this patent is extended or adjusted under 35 U.S.C. 154(b) by 673 days.

(21) Appl. No.: 12/537,662

(22) Filed: Aug. 7, 2009

(65) Prior Publication Data

US 2010/0035663 A1 Feb. 11, 2010

(30) Foreign Application Priority Data

Aug. 7, 2008 (EP) .................................... 08014157

(51) Int. Cl.
*H04M 1/00* (2006.01)

(52) U.S. Cl. ............... 455/569.1; 455/569.2; 455/570; 379/420.01; 379/420.02; 379/420.03; 379/420.04

(58) Field of Classification Search ........ 455/569.1–570; 379/420.01–420.04
See application file for complete search history.

(56) References Cited

U.S. PATENT DOCUMENTS

| | | | | |
|---|---|---|---|---|
| 4,629,829 A * | 12/1986 | Puhl et al. | ..................... | 455/570 |
| 6,233,462 B1 * | 5/2001 | Kanai | ........................... | 455/567 |
| 6,363,156 B1 * | 3/2002 | Roddy | ............................ | 381/86 |
| 7,623,854 B2 * | 11/2009 | Satoh | ............................ | 455/420 |
| 7,689,233 B2 * | 3/2010 | Cao et al. | ...................... | 455/462 |
| 2005/0014535 A1 * | 1/2005 | Desai et al. | ................ | 455/569.1 |
| 2005/0064835 A1 | 3/2005 | Gusler et al. | ............... | 455/245.1 |
| 2005/0129224 A1 * | 6/2005 | Piket et al. | ............... | 379/406.01 |
| 2007/0155380 A1 * | 7/2007 | Cao et al. | .................... | 455/426.1 |
| 2010/0022282 A1 * | 1/2010 | Piket et al. | ................ | 455/569.2 |

FOREIGN PATENT DOCUMENTS

| | | |
|---|---|---|
| EP | 1 748 636 B1 | 1/2007 |
| WO | WO 00/30266 | 5/2000 |
| WO | WO 2008/061205 A2 | 5/2008 |
| WO | WO 2008/061205 A3 | 5/2008 |

OTHER PUBLICATIONS

European Patent Office, European Search Report, Application No. 08014157.5-1246; Dec. 22, 2008.

* cited by examiner

*Primary Examiner* — Fayyaz Alam
(74) *Attorney, Agent, or Firm* — Sunstein Kann Murphy & Timbers LLP (57) ABSTRACT

The present invention relates to a signal processing system, comprising a number of microphones and loudspeakers, a hands-free set configured to receive a telephone signal from a remote party and to transmit a microphone signal supplied by at least one of the microphones to the remote party; an in-vehicle communication system configured to receive a microphone signal supplied by at least one of the microphones; receive the telephone signal; amplify the microphone signal to obtain at least one first output signal; output the at least one first output signal and/or a second output signal corresponding to the telephone signal to at least one of the loudspeakers; and wherein the signal processing systems is configured to detect speech activity in the telephone signal and to control the in-vehicle communication system to reduce amplification of the microphone signal by a damping factor, if it is detected that speech activity is present in the telephone signal.

12 Claims, 5 Drawing Sheets

HANDS-FREE TELEPHONY AND IN-VEHICLE COMMUNICATION

PRIORITY

The present U.S. patent application claims priority from European Patent Application No. 08014157.5 entitled Hands-Free Telephony and In-Vehicle Communication that was filed on Aug. 7, 2008, the content of which is incorporated by reference herein in its entirety.

FIELD OF INVENTION

The present invention relates to the art of in-vehicle communication and, in particular, to a hands-free telephony set operated in combination with an in-vehicle communication system both installed in an automobile.

BACKGROUND OF THE INVENTION

Verbal communication in interiors is often affected by a noisy background and in case of electronically amplified communication feedback effects tend to deteriorate the quality of the processed acoustic signals. A prominent example for communication in interiors is the communication of passengers in passenger compartments of automobiles. In particular, at high traveling speeds dialogs between back and front passengers are easily disturbed by background noise. If additional audio signals, e.g., from a radio or a CD player, are output during the conversation, the intelligibility of the utterances deteriorates further.

To improve the intelligibility of the passengers' utterances in-vehicle communication systems (intercom systems) comprising speech processing module are more and more commonly installed in passenger compartments. Microphones mounted near each seat of the passenger compartment can detect speech signals from the passengers. The microphone signals are processed by a speech signal processing module and output by loudspeakers. Speech signals coming from a back passenger are preferably output by front loudspeakers and vice versa.

Since the passenger compartments represent relatively small interiors, the output signals from the loudspeakers are easily fed back to the microphones, if interior communication system comprising microphones and loudspeakers are used. Consequently, it is necessary to reduce acoustic feedback that otherwise can cause, e.g., unpleasant echoes. In the worst case, acoustic feedback can even result in a complete breakdown of communication. Reliable feedback reduction module cannot easily be designed, since the reverberating characteristics of passenger compartments are rather complex.

In addition to in-vehicle communication systems (Intercom systems) hands-free sets are commonly installed in passenger compartments. Such hands-free sets allow for convenient telephony communication with remote parties. Again, reliable echo compensation/reduction and noise reduction are mandatory for a successful communication with a sufficient intelligibility of the transmitted/received speech signals. Moreover, during a telephone call and communication that is established via the hands-free set the communication between individual passengers of the vehicle is affected.

In general, when an in-vehicle communication system is activated during a telephone call carried out via the hands-free set the performance of the hands-free set is affected by the operation of the in-vehicle communication system and vice versa. In particular, echo paths within the passenger compartment are strongly and rapidly changing due to the in-vehicle communication system and, thus, echo compensation/reduction fails or is at least insufficiently achieved to guarantee intelligibility of processed speech signals.

Therefore, there is a need for a method of a combined operation of an in-vehicle communication system and a hands-free set that does not result in a reduced quality of the processed speech signals and particularly avoids echoes in the speech signals transmitted by the hands-free set to a remote communication partner.

SUMMARY OF THE INVENTION

The above-mentioned problem is solved by the signal processing system that includes a number of microphones and loudspeakers along with a hands-free telephone set and an in-vehicle communication system. In such a signal processing system the hands-free telephony set is configured to receive a telephone signal from a remote party and to transmit a microphone signal supplied by at least one of the microphones to the remote party. The in vehicle communication system is configured to receive a microphone signal supplied by at least one of the microphones and receive the telephone signal. The in-vehicle communication system amplifies the microphone signal to obtain at least one first output signal and outputs the at least one first output signal and/or a second output signal corresponding to the telephone signal to at least one of the loudspeakers. The signal processing systems is configured to detect speech activity in the telephone signal and to control the in-vehicle communication system to reduce amplification of the microphone signal. In particular, the reduction of the amplification is accomplished using a damping factor, if it is detected that speech activity is present in the telephone signal.

The hands-free set allows for hands-free telephony and may comprise a receiver/transmitter unit for the reception of a telephone signal sent by a remote unit and for the transmission of microphone signals corresponding to utterances by the passengers in the passenger compartment. Moreover, the hands-free set comprises an echo compensation filtering module for reducing echoes in the microphone signals transmitted to the remote party. The hands-free set may also be configured with a speech recognition module allowing speech control of elements of the vehicle inside and/or outside the passenger compartment and, in particular, of electronic devices as, e.g., a car radio or a navigation system.

The in-vehicle communication system (Intercom vehicle system) provides electronically mediated communication between the passengers of the vehicle, in particular, between front and back passengers. The in-vehicle communication system comprises a mixing module for providing loudspeaker outputs to one or more passengers corresponding to microphone signals (inputs) received from another one of the passengers. Moreover, the in-vehicle communication system can be used to output the telephone signal to one or more loudspeakers. It should be noted that the hands-free set and in-vehicle communication system may be realized not as completely separate physical or logic units but may share several electronic and logic components and operational modules.

The number of microphones may be installed in form of microphone arrays provided in the vicinity of each seat of the passenger compartment. When microphone arrays are installed the microphone signals processed by the in-vehicle communication system are previously beamformed by some beamforming module as known in the art.

Different from the art, according to the inventive signal processing system amplification of microphone signals for output by the in-vehicle communication system depends on speech activity detected in the telephone signal received from a remote communication party located outside the passenger compartment. Since the microphone signals particularly contain contributions due to the loudspeaker outputs and, thus, the output telephone signal, echoes in the microphone signals due to the output telephone signal can be reduced by damping the amplification of the microphone signals when speech in the telephone signal is detected. Thus, the microphone signal transmitted to the remote party can be kept (almost) free of annoying echoes by employing an echo compensation filtering module as known in the art even in the case of electronically mediated communication of the passengers.

According to an example, the hands-free set comprises an adaptive echo compensation filtering module and is configured to adapt the filter coefficients of the echo compensation filtering module only when the at least one first output signal output by the in-vehicle communication system is damped, e.g., by a damping factor to a predetermined level.

It is advantageous to adapt (adjust) the filter coefficients of the echo compensation filtering module dependent on the actual damped amplification of the first output signal (Intercom signal), since the damping by the damping factor needs some finite time period which affects the convergence of adaptation algorithms in the case of an abrupt onset of speech activity by the remote communication partner, i.e. the transition from a speech pause to speech activity in the telephone signal. This convergence problem is alleviated by waiting for a sufficient damping of the amplification and only subsequent adaptation of the filter coefficients.

According to an embodiment of the above-described signal processing system the in-vehicle communication system is configured to receive multiple microphone signals in multiple channels and to amplify the multiple microphone signals to obtain multiple first output signals and the signal processing system further comprises a power estimating module configured to estimate the short-time power density of the multiple first output signals and to supply the maximum of the short-time power densities of the multiple first output signals to the hands-free set. The hands-free set is configured to determine whether the at least one first output signal output by the in-vehicle communication system is damped, e.g., by a damping factor, to the predetermined level based on the maximum of the short-time power densities of the multiple first output signals.

In principle, the in-vehicle communication system may provide a number of channels corresponding to microphone signals obtained by microphones in the vicinities of the individual seats of the passenger compartment. For five seats, for example, five channels may be provided. Accordingly, for each channel or a selected number of channels amplified microphone signals can be obtained. The strongest amplified signal, i.e., the signal exhibiting the maximum short-time power density is used to determine whether amplification has already been damped to a predetermined level in order to decide that adaptation of the echo compensation filtering module of the hands-free set can be performed. Thereby, a very reliable criterion for starting the filter adaptation is obtained. Details of the realization of this embodiment can be found in the detailed description below.

According to another embodiment of the herein disclosed signal processing system the hands-free set comprises a first equalization filtering module configured to equalize microphone signals obtained by at least one of the number of microphones and input in the hands-free set and to adapt the filter coefficients of the first equalization filtering module in the sub-band or Fourier domain; and the in-vehicle communication system comprises a second equalization filtering module configured to equalize microphone signals input in the in-vehicle communication system and to adapt the filter coefficients of the second equalization filtering module in the time domain based on the adapted filter coefficients of the first equalization filtering module.

The hands-free set performs signal processing in the sub-band or Fourier domain, i.e. the microphone signal input in the hands-free set is divided into sub-band microphone signals by means of an analysis filter bank or, alternatively, subject to a Fast Fourier Transformation, in order to save computational load in the further processing. In particular, adaptation of filter coefficients can be achieved significantly faster in the sub-band or Fourier domain than in the full-band time domain.

However, the in-vehicle communication system has to operate in the full-band time domain, since time delays introduced by the sub-band/Fourier processing are not acceptable in the context of the electronically mediated in-vehicle communication.

Thus, according to this embodiment equalization of microphone signals in the in-vehicle communication system can profit from the faster adaptation of filter coefficients of an equalization module provided in the hands-free set in the sub-band or Fourier domain. An example for determining the filter coefficients of the equalization module of the in-vehicle communication system from the previously determined filter coefficients of the hands-free set is described in the detailed description below.

On the other, hand processing in the time domain allows for immediate detection of changes in signal characteristics, in particular, the transition from speech pause to speech activity. In this context, adaptation of filtering module, in particular, the echo compensation filtering module, in the hands-free set can profit from detection of speech activity by the in-vehicle communication system.

Therefore, it is provided the signal processing system according to one of the preceding examples, wherein:

the in-vehicle communication system is configured to process the microphone signal in the time domain; and the hands-free set further comprises an analysis filter bank to obtain microphone sub-band signals or a Fourier transform module to obtain Fourier transformed microphone signals; and wherein the in-vehicle communication system is configured to detect speech activity in microphone signals obtained by at least one of the number of microphones and input in the in-vehicle communication system by processing the microphone signals in the time domain; and supply a signal to the hands-free set operating in the sub-band or Fourier domain that indicates speech activity or no speech activity.

Thus, the hands-free set can be immediately informed about local speech activity due to utterances by one or more passengers in the passenger compartment. As soon as the hands-free set receives a signal from the in-vehicle communication system indicating speech activity adaptation of the echo compensation filtering module, background estimators, etc. can be stopped in order to avoid maladjustment.

According to another example in the signal processing system according to one of the above embodiments, the hands-free set is configured to detect speech activity in the telephone signal and to supply a damping factor to the in-vehicle communication system, if it is detected that speech activity is present in the telephone signal. Thus, the hands-free set provides control of the in-vehicle communication system. The latter can operate similar to any in-vehicle communication system known in the art until it is informed by the hands-free set about speech activity by a remote party. In response, amplification of the microphone signals is damped based on the supplied damping factor to some predetermined level in order to allow the hands-free set reliable echo compensation by an echo compensation filtering module.

It should be noted that in the signal processing system according to one of the above examples the hands-free set may comprise or may be connected with a speech recognition module and/or a speech control module.

The present invention, moreover, provides a vehicle, in particular, an automobile, wherein the signal processing system according to one of the above-mentioned examples is installed, wherein the hands-free set and the in-vehicle communication system are configured to be operated simultaneously and to exchange data with each other.

Moreover, it is provided an in-vehicle communication system, comprising microphones and loudspeakers; and configured to:

receive a microphone signal supplied by at least one of the microphones;

receive a telephone signal transmitted by a remote party;

amplify the microphone signal to obtain at least one first output signal;

output the at least one first output signal and/or a second output signal corresponding to the telephone signal to at least one of the loudspeakers;

detect speech activity in the telephone signal; and control the amplification of the microphone signal in response to whether or not it is detected that speech activity is present in the telephone signal.

In particular, the in-vehicle communication system is configured to amplify microphone signals when no speech activity in the telephone signal is detected and to reduce amplification or perform no amplification at all when speech activity in the telephone signal is detected.

This in-vehicle communication system might be part of the above-described examples of the signal processing system.

The above-posed problem is also solved by a method for speech communication by means of a hands-free set and an in-vehicle communication system, in particular, both installed in a passenger compartment, according to claim 8. This method comprises the steps of receiving a telephone signal from a remote party by the hands-free set;

determining whether or not speech is present in the received telephone signal;

detecting an utterance of a passenger in the passenger compartment by at least one of a set of microphones installed in the passenger compartment to obtain a microphone signal;

processing the microphone signal by the in-vehicle communication system to obtain at least one first processed signal;

processing the telephone signal by the in-vehicle communication system or the hand-free set to obtain a second processed signal;

outputting the at least one first and/or second processed signal to at least one loudspeaker installed in the passenger compartment;

and wherein the processing of the microphone signal by the in-vehicle communication system comprises amplifying the microphone signal by a first gain factor when it is determined that no speech is present in the telephone signal and by a second gain factor smaller than the first gain factor when it is determined that speech is present in the telephone signal.

The second gain factor may, in particular, be 1 corresponding to no amplification at all. The processing may further comprise equalization of microphone signals as well as signals output by the in-vehicle communication system. Moreover, the microphone signals may be filtered for reduction of background noise present in the microphone signals.

The method may further comprise the steps of inputting the microphone signal in the hands-free set comprising an adaptive echo compensation filtering module;

echo compensating the microphone signal input in the hands-free set by the adaptive echo compensation filtering module; and transmitting the echo compensated microphone signal to the remote party.

The filter coefficients of the echo compensation filtering module may only be adapted when the at least one first processed signal output by the in-vehicle communication system/loudspeakers is damped, in particular, damped by a damping factor, to a predetermined level with respect of the first gain factor. As described in the context of the provided signal processing system the short-time power density of multiple output signals of output channels of the in-vehicle communication system can be used to determine whether or not the first processed signal output by the in-vehicle communication system/loudspeakers is sufficiently damped (see also detailed description below).

Either the employed hands-free set or the in-vehicle communication system or both may determine whether or not speech is present in the telephone signal and may provide a damping factor, In this case, the second gain factor is obtained on the basis of the first gain factor and the damping factor. In particular, the second gain factor may be obtained by multiplication of the first gain factor and the damping factor the latter being less than 1.

The hands-free set may comprise a first equalization filtering module configured to equalize microphone signals obtained by at least two of the set of microphones and input in the hands-free set;

the in-vehicle communication system may comprise a second equalization filtering module configured to equalize microphone signals input in the in-vehicle communication system; and the above examples of the inventive method may, furthermore, comprise the steps of adapting the filter coefficients of the first equalization filtering module in the sub-band or Fourier domain; and adapting the filter coefficients of the second equalization filtering module in the time domain based on the adapted filter coefficients of the first equalization filtering module.

The method for speech communication by means of a hands-free set and an in-vehicle communication system may further comprise detecting speech activity in microphone signals obtained by at least one of the set of microphones and input in the in-vehicle communication system by processing the microphone signals in the time domain by the in-vehicle communication system; and supplying a signal by the in-vehicle communication system to the hands-free set operating in the sub-band or Fourier domain that indicates speech activity or no speech activity present in the microphone signal in response to the step of speech detection.

The damping factor $g_{rei}(n)$ for reducing the first gain factor to the second one can, for example, be determined according to $$g_{tel}(n) = \begin{cases} \max\{g_{min}, g(n-1)g_{dek}\}, & \text{if } |\overline{x_{tel}(n)}| > \overline{x_0}, \\ \min\{1, g(n-1)g_{ink}\}, & \text{else,} \end{cases}$$

where $|\overline{x_{tel}(n)}|$ is the short-time smoothed magnitude of the telephone signal $x_{tel}(n)$, $\overline{x_0}$ and $g_{min}$ denote a predetermined threshold and the maximum damping factor, respectively, and the relation $0 \ll g_{dek} < 1 < g_{ink} \ll \infty$ holds for the real factors $g_{dek}$ and $g_{ink}$. A suitable choice for the minimum damping is given by $g_{min} = 0.005 \ldots 0.015$, in particular, $g_{min} = 0.01$, for example.

Short-time smoothing of the magnitude of the telephone signal $x_{tel}(n)$ can be done according to $$|\overline{x_{tel}(n)}| = \lambda_{tel}|\overline{x_{tel}(n-1)}| + (1-\lambda_{tel})|x_{tel}(n)|$$

where the damping constant $\lambda_{tel}$ might be chosen from 0.993 to 0.999 (by $|\overline{x_{tel}(n)}|$ the smoothed magnitude of the telephone signal $x_{tel}(n)$ is denoted).

By the above expressions, a very efficient and reliable damping of the amplification that was previously obtained according to the first amplification rate is achieved when speech activity is detected in the telephone signal.

The present invention, moreover, provides a computer program product comprising at least one computer readable medium having computer-executable instructions for performing one or more steps of the method of one of the above examples when run on a computer.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Consider a situation in that telephony communication is carried out between one or more passengers in a vehicle on the near side of communication and a remote party outside the vehicle by means of a hands-free set installed in the vehicle. Speech signals are wirelessly transmitted from one communication party to the other. In order to improve the communication between the passengers, in particular, between front and back passengers, simultaneously an in-vehicle communication system is operated. Both the hands-free set and the in-vehicle communication system make use of the same microphones and loudspeakers installed in the passenger compartment of the vehicle close to the individual seats of the compartment.

Figure 1:
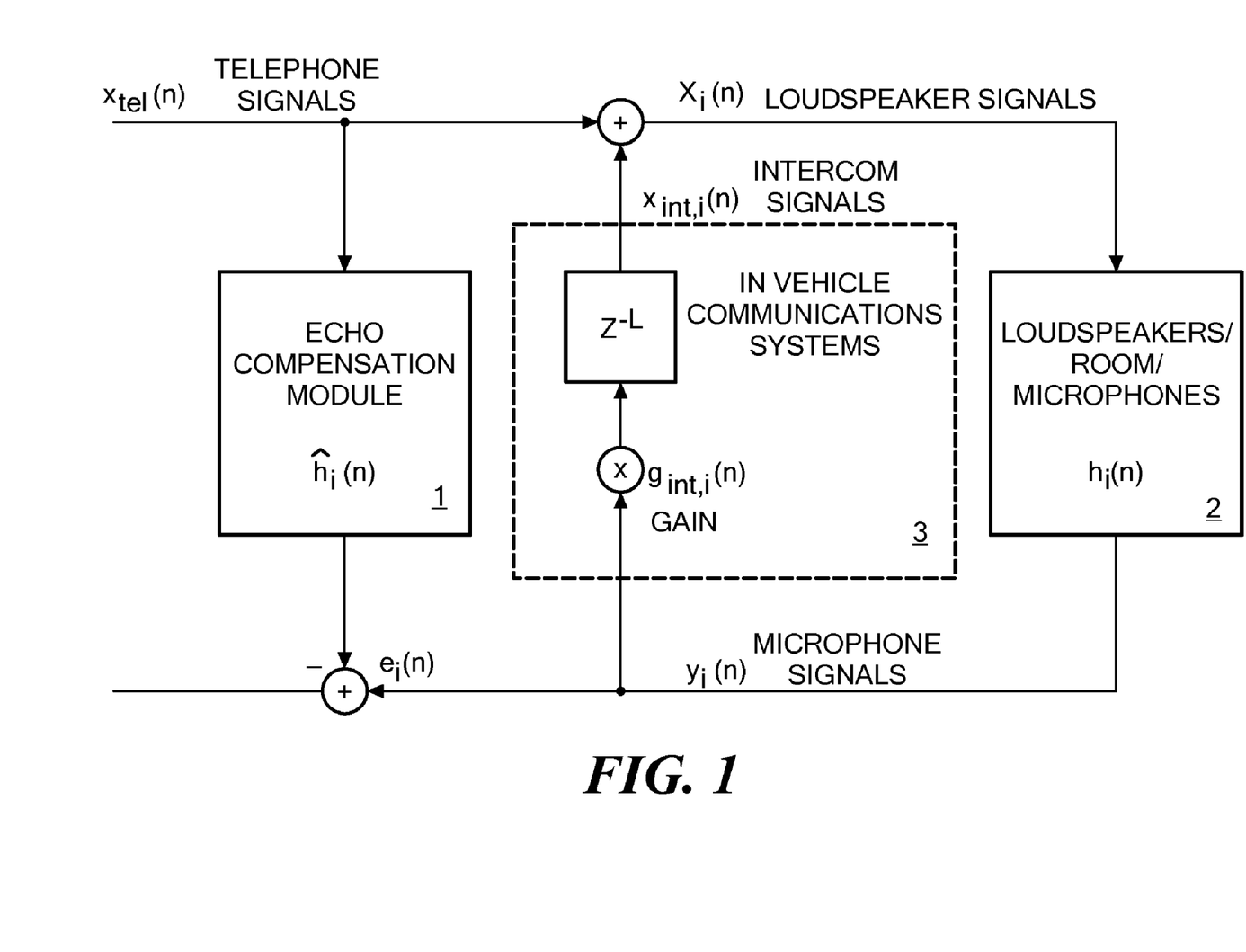
FIG. 1 illustrates a problem that occurs when a hands-free set and an in-vehicle communication system that are installed in a vehicle are operated simultaneously.
Figure 1A:
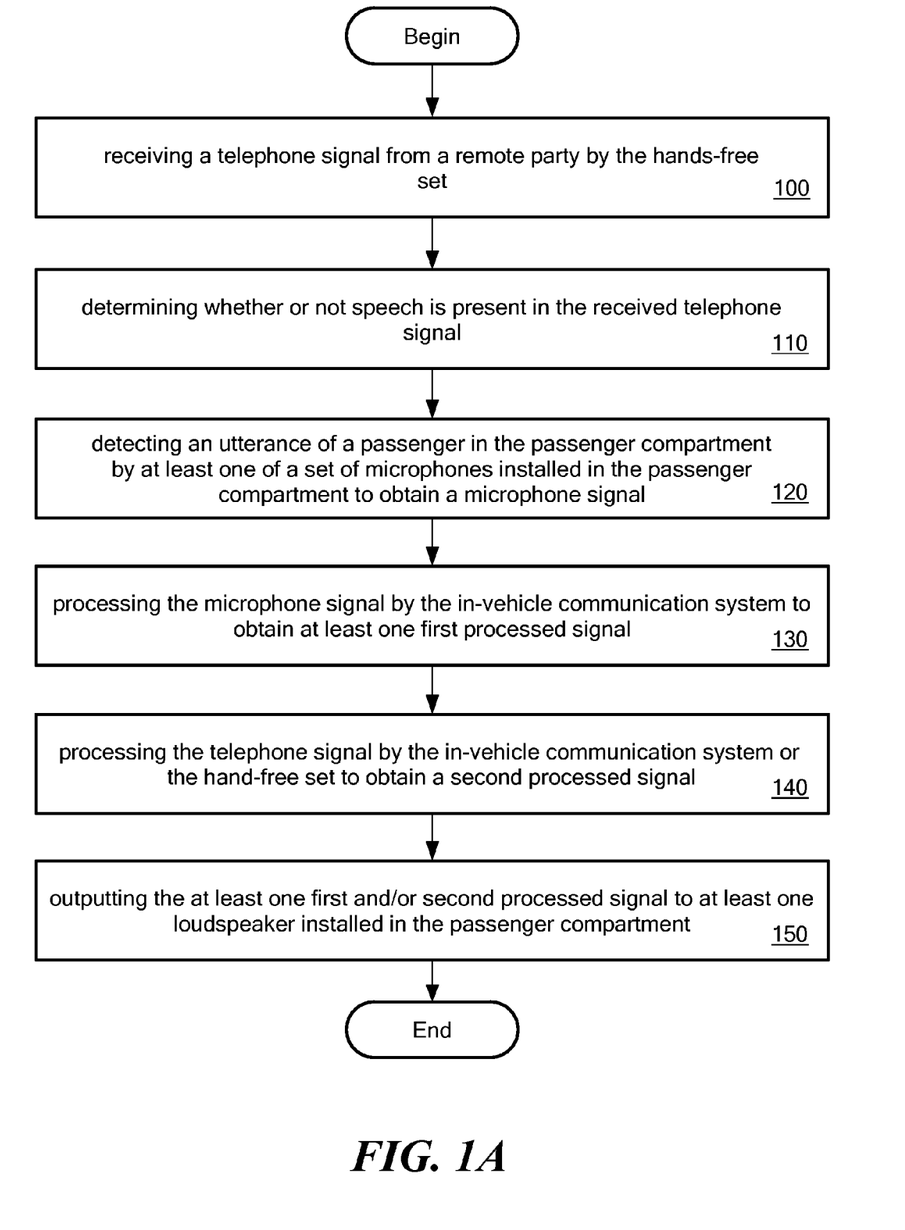
FIG. 1A is a flow chart that demonstrates the basic methodology for reducing noise and echoes between an in-vehicle communication system and a hands-free telephony system.

FIG. 1A shows a flow chart for reducing noise and especially echoes between a hands-free telephony system and an in-car communication system using signal processing. A telephone signal from a remote party is received by the hands-free set. 100 The signal processing system determines whether or not speech is present in the received telephone signal. 110 The signal processing system detects whether an utterance of a passenger in the passenger compartment occurs. 120 This is achieved using least one of a set of microphones installed in the passenger compartment to obtain a microphone signal. The signal processing system processes the microphone signal by the in-vehicle communication system to obtain at least one first processed signal. 130 The telephone signal of the in-vehicle communication system or the hand-free set is then processed to obtain a second processed signal. 140 The least one first and/or second processed signal is directed to at least one loudspeaker installed in the passenger compartment. 150 The processing of the microphone signal by the in-vehicle communication system includes amplifying the microphone signal by a first gain factor when it is determined that no speech is present in the telephone signal and by a second gain factor smaller than the first gain factor when it is determined that speech is present in the telephone signal.

With reference to FIG. 1 the hands-free set comprises an echo compensation module 1 for estimating the impulse response ($h_i(n)$) of the loudspeakers-room (passenger compartment)-microphones system 2 in order to obtain an enhanced microphone signal without significant echo contributions. Ideally, without operation of the in-vehicle communication system the optimal estimated impulse response ($\hat{h}_{opt,i}(n)$) would be the real impulse response ($h_i(n)$) of the loudspeakers-room-microphones system 2. Here, and in the following the argument n indicates the discrete time index of some sampled signal.

However, operation of the in-vehicle communication system gives raise to time-dependent gains of the individual loudspeaker signals $x_i(n)$ comprising telephone signals $x_{tel}(n)$ transmitted by the remote party and signals $x_{int,i}(n)$ (Intercom signals) corresponding to signals detected and input to the in-vehicle communication system by one or more microphones $x_i(n) = x_{tel}(n) + x_{int,i}(n)$. It is noted that the telephone signal $x_{tel}(n)$ is output by all individual loudspeakers, whereas the Intercom signals corresponding to the microphone signals obtained by the microphones are output to individually selected loudspeakers according to the control of the in-vehicle communication system.

Moreover, the in-vehicle communication system 3 introduces some time-delay of the loudspeaker signals $x_i(n)$. Therefore, the optimal adaptation of the echo compensation module 1, in particular, depends on the gain $g_{int,i}(n)$ provided for the i-th microphone signal by the in-vehicle communication system 3 in order to obtain amplified loudspeaker signals $x_{int,i}(n)$ corresponding to the microphone signals input to the in-vehicle communication system 3. In the sub-band (or Fourier) regime the estimate for the optimal impulse response reads $$\hat{H}_{opt,i}(e^{j\Omega}, n) \approx \frac{H_i(e^{j\Omega}, n)}{1 - H_i(e^{j\Omega}, n) g_{int,i}(n) e^{-j\Omega L}}$$

where $\Omega$ denotes the (mid) frequency of the frequency subband or the Fast Fourier node and L denotes the length of the impulse response of the loudspeakers-room-microphones system 2. In the following, it is assumed that processing is performed in the sub-band regime. However, processing could alternatively be carried out in the Fourier regime after Fast Fourier Transformation of the signals that are to be processed.

Since the gain $g_{int,i}(n)$ usually is highly time-dependent the solution of the above equation changes rather quickly. Conventional adaptation schemes are not able to sufficiently adapt the echo compensation filtering module 1 in order to suppress echoes in the acoustic (speech) signals transmitted to the remote party. Thus, the quality of speech signals transmitted to the remote party suffers from such acoustic echoes caused by the loudspeaker outputs and, thereby, the intelligibility of the received speech signals is heavily affected.

Figure 2:
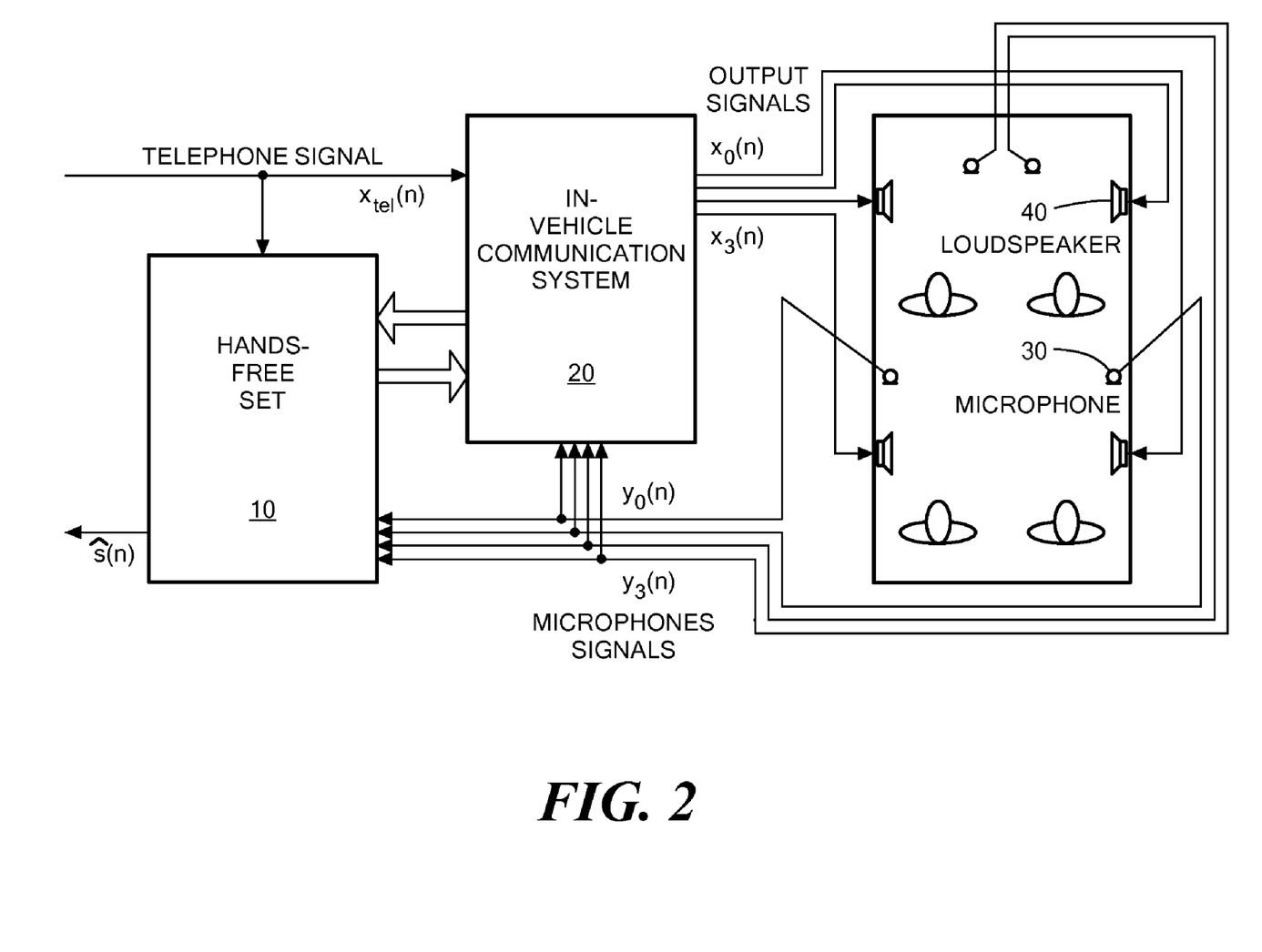
FIG. 2 illustrates an example of the simultaneous operation of a hands-free set installed in a vehicle and an in-vehicle communication system according to the present invention.
Figure 3:
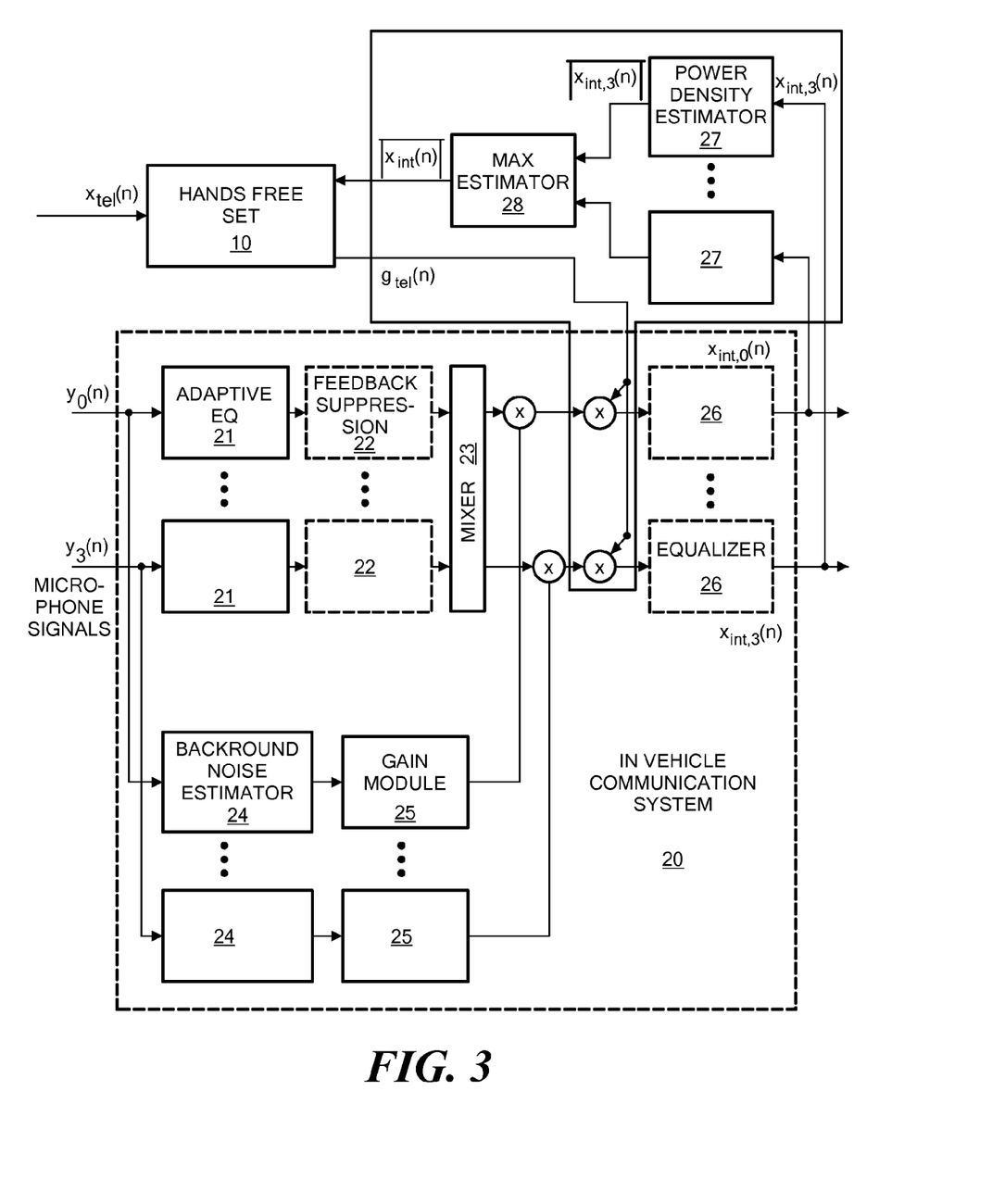
FIG. 3 illustrates an example of the simultaneous operation of a hands-free set installed in a vehicle and an in-vehicle communication system according to the present invention including damping of the output signals of the in-vehicle communication system and adaptive echo-compensation of microphone signals depending on the damping rate of that output signals.

The present invention provides a solution for this problem by coupling the hands-free set and the in-vehicle communication system as shown in FIG. 2 and, in particular, by the introduction of adaptive damping of the output signals of the in-vehicle communication system as illustrated in FIG. 3. Thus, different from the art the hands-free telephony set and the in-vehicle communication system are not operated completely independent from each other.

In the following, an example of a coupled hands-free set 10 and in-vehicle communication system 20 will be described with reference to FIG. 2. Microphones 30 and loudspeakers 40 are installed in a passenger compartment. One or more microphones 30 and one or more loudspeakers 40 are provided for each passenger (seat), i.e. positioned in the vicinity of a potential speaker/listener present in the passenger compartment.

A telephone signal $x_{tel}(n)$ is received by the hands-free set 10 and the in-vehicle communication system 20. Whereas not indicated in FIG. 2 it should be understood that the telephone signal $x_{tel}(n)$ might be subject to automatic gain control, band width extension up-sampling, etc., before it is input in the in-vehicle communication system 20. Different from the art the hands-free set 10 and in-vehicle communication system 20 are configured to exchange data as it is indicated by the arrows directed from one to the other and as it is described below.

The in-vehicle communication system 20 receives microphone signals $y_i(n)$ (i=0, 1, 2 . . . ) from the microphones 30 installed in the passenger compartment and can process them for output to one or more of the loudspeakers 40 installed in the passenger compartment. For instance, a microphone signal obtained by one of the microphones installed in the front of the passenger compartment might be output to one or more of the loudspeakers installed in the back of the passenger compartment in order to improve communication between front and back passengers. In addition, the in-vehicle communication system 20 is configured to output the telephone signal $x_{tel}(n)$ to one or more of the loudspeakers 40 installed in the passenger compartment to allow communication of a remote party with one or more of the passengers.

The microphone signals $y_i(n)$ are, furthermore, input in the hands-free set 10 to allow telephony communication of the passengers with the remote party. It should be noted that the microphones 30 and loudspeakers 40 can be considered being part of both the hands-free set 10 and the in-vehicle communication system 20.

As described with reference to FIG. 1, in conventional simultaneous operation of both the hands-free set 10 and the in-vehicle communication system 20 the quality of speech signals transmitted to the remote party suffers from acoustic echoes. In order to suppress these echoes according to the present invention the output signals $x_i(n)$ of the in-vehicle communication system 20 are damped such that the gain $g_{int,i}(n)$ provided for the i-th microphone signal by the in-vehicle communication system is reduced when speech activity is detected in the telephone channel (telephone signal $x_{tel}(n)$). Reduction of the gain is performed such that $$\hat{H}_{opt,i}(e^{j\Omega},n)|_{g_{int,i}(n)<<1} \approx H_i(e^{j\Omega},n),$$

which enables reliable echo compensation of the microphone signals transmitted after processing in the hands-free set to the remote party. For instance, speech activity in the telephone channel can be detected by the hands-free set 10 and a corresponding damping factor $g_{tel}(n)$ may be supplied by the hands-free set 10 to the in-vehicle communication system 20 to reduce the gain $g_{int,i}(n)$ (see also FIG. 3).

If the remote party is not transmitting a speech signal, i.e. the remote speaker is actually not speaking (no speech activity in the telephone channel), or only any of the passengers is (are) speaking, no damping shall occur ($g_{tel}(n)$=1). The in-vehicle communication system 20 can correspondingly be controlled to employ the full gain $g_{int,i}(n)$ in these cases. Thus, communication between the passengers is still facilitated by the in-vehicle communication system 20, when the remote party is silent and the problem of insufficient echo compensation present in the art is solved or at least alleviated.

The determination of the damping factor $g_{tel}(n)$ can include short-time smoothing of the magnitude of the telephone signal $x_{tel}(n)$ according to $$|\overline{x_{tel}(n)}| = \lambda_{tel}|\overline{x_{tel}(n-1)}| + (1-\lambda_{tel})|x_{tel}(n)|$$

where the damping constant $\lambda_{tel}$ might be chosen from 0.993 to 0.999. Note, that herein by || the smoothed magnitude of a quantity is denoted. If $|\overline{x_{tel}(n)}|$ exceeds a predetermined threshold $\overline{x_0}$, the damping factor $g_{tel}(n)$ is increased and otherwise it is decreased. This might be achieved according to $$g_{tel}(n) = \begin{cases} \max\{g_{min}, g_{tel}(n-1)g_{dek}\}, & \text{if } |\overline{x_{tel}(n)}| > \overline{x_0}, \\ \min\{1, g_{tel}(n-1)g_{ink}\}, & \text{else.} \end{cases}$$

In this relation $0 << g_{dek} < 1 < g_{ink} << \infty$ holds for the real factors $g_{dek}$ and $g_{ink}$. A suitable choice for the minimum damping is given by $g_{min}$=0.01, for example.

Still problems occur at the onset of speech activity in the telephone channel due to the finite time it takes to switch on the damping factor $g_{tel}(n)$. In order to avoid the corresponding deterioration of the convergence of the adaptation of the filter coefficients of the echo compensation filtering module employed for echo compensation of the microphone signals that are to be processed and transmitted to the remote party, according to the example shown in FIG. 3, adaptation of the echo compensation filtering module is only performed when the output signals $x_{int}(n)$ of the in-vehicle communication system 20, i.e., the individual loudspeaker signals corresponding to the processed microphone signals, are already sufficiently damped.

In FIG. 3 again a hands-free set 10 receiving a telephone signal $x_{tel}(n)$ from a remote party and an in-vehicle communication system 20 in that microphone signals $y_0(n)$ to $y_3(n)$ are input, for example, are illustrated. The microphone signals $y_0(n)$ to $y_3(n)$ may be beamformed microphone signals and correspond to seats No. "0" to seat No. "3" of the passenger compartment of a vehicle, respectfully. In the shown example, the in-vehicle communication system 20 comprises adaptive module for equalization of microphone signals 21, module for feedback suppression and further processing 22 and an adaptive mixing module 23 configured to control the mapping of input to output channels of the in-vehicle communication system 20.

In the case, for example, that the driver on seat No. "0" is speaking only, the mixing module can activate the loudspeakers at the back seats No. "2" and "3" only. In addition, background noise estimators 24 and noise dependent gain module 25 for amplifying the signals output by the mixing module 23 by the gain factors $g_{int,i}(n)$ (here i=0, 1, 2, 3) are provided. Moreover, the in-vehicle communication system 20 comprises components 26 for equalization of the output signals $x_{int,0}(n)$ to $x_{int,3}(n)$ (Intercom signals) that are output to loudspeakers corresponding to seats No. "0" to "3", respectfully, in the example shown in FIG. 3.

The hands-free set 10 detects whether or not speech is present in the telephone signal $x_{tel}(n)$. When speech is detected a finite damping factor $g_{tel}(n)$ is supplied to the in-vehicle communication system 20 for corresponding reduction of the gain factors $g_{int,i}(n)$.

The Intercom signals $x_{int,i}(n)$ (signal contributions apart from the telephone signal to the signals output by the in-vehicle communication system 20) are input to short-time power density estimators 27 providing magnitudes of the short-time smoothed signals $x_{int,i}(n)$ according to $$|\overline{x_{int,i}(n)}| = \lambda_{int}|\overline{x_{int,i}(-1)}| + (1-\lambda_{int})|x_{int,i}(n)|$$

where the damping constant $\lambda_{int}$ might be chosen similar to the damping constant $\lambda_{tel}$, i.e. from 0.993 to 0.999. The smoothed signals $|\overline{x_{int,i}(n)}|$ are input by the short-time power density estimators 27 to a maximum estimating module 28 to obtain the $$\text{maximum}\{\overline{x_{int}(n)}\} = \max_i \{|\overline{x_{int,i}(n)}|\}.$$

It should be understood that both the short-time power density estimators 27 and the maximum estimating module 28 may be realized as parts of the in-vehicle communication system 20.

The maximum $|\overline{x_{int}(n)}|$ is input in the hands-free set 10 that comprises an adaptive echo compensation filter. Dependent on the magnitude of $|\overline{x_{int}(n)}|$ the filter coefficients of the adaptive echo compensation filter of the hands-free set are adapted or not. Adaptation can, e.g., be controlled by $$\alpha(n) = \begin{cases} 1, & \text{if } |\overline{x_{tel}(n)}|K_{EK} > |\overline{x_{int}(n)}| \\ 0, & \text{else.} \end{cases}$$

Here, the predetermined constant $K_{EK}$ might be chosen from 0.03 to 0.2 for reliable echo compensation. Experiments by the inventors have proven that significantly enhanced intelligibility of speech signals transmitted to the remote party via the hands-free set 10 can be achieved by the combined damping of the Intercom signals and the adaptation of the echo compensation filter of the hands-free set 10 controlled by the power densities of these output signals as described above.

In general, processing in the hands-free set is performed in the sub-band or Fourier domain in order to reduce the computational load. Analysis and synthesis filter banks are used to transform the full-band signal that is to be processed from the time domain to the sub-band or Fourier domain. These filter banks, however, introduce some time delay of signal processing. Therefore, processing in the sub-band or Fourier domain is not suitable for the signal processing in the in-vehicle communication system, since delays of only about 20 ms would yet result in the perception of echoes of utterances of the passengers.

Whereas this means that processing in the time domain is necessary in the in-vehicle communication system which implies a relatively high demand for computational resources, on the other hand the processing in the time domain allows almost instantaneous detection of signal characteristics, e.g., the onset of speech activity.

Thus, when the hands-free set and the in-vehicle communication system are operated simultaneously and are configured to exchange data with each other, it can be arranged to determine filter coefficients, e.g., for echo compensation filtering module or equalization module, by the hands-free set in the sub-band domain and to update corresponding filter coefficient in the in-vehicle communication system at predetermined time intervals by supply of the data on filter coefficients determined by the hands-free set to the in-vehicle communication system.

On the other hand, the in-vehicle communication system can provide the hands-free set with information of the detection of an abrupt change of signal characteristics as the onset of speech activity in one of the microphone signals obtained by a microphone installed in the passenger compartment.

Equalization of microphone signals, for instance, is advantageous in both the hands-free set and the in-vehicle communication system, in particular, in the case of beamforming of microphone signals. According to an example, equalization filters are adjusted during speech pauses such that similar background noise power densities are present at all microphones. This can be achieved in the hands-free set, e.g., as follows.

For each microphone signal $y_i(n)$ after transformation to sub-band microphone signals $Y_i(e^{j\Omega_\mu}, n)$ the noise power density spectrum $\hat{S}_{b_ib_i}$ is estimated by means as, e.g., described in "Echo and Noise Control—A Practical Approach", by E. Hansler and G. Schmidt, John Wiley & Sons, Hoboken, N.J., USA, 2004.

From these noise power density spectra an average estimated noise power density spectrum $\hat{S}_{avg,bb}$ is determined by $$\hat{S}_{avg,bb}(\Omega_\mu, n) = \frac{1}{4}\sum_{i=0}^{3}\hat{S}_{b_ib_i}(\Omega_\mu, n)$$

for the case of four microphones (or microphone arrays) corresponding to four seats of a passenger compartment (note that $\Omega_\mu$ denotes the mid frequency of the μ-th sub-band).

An equalization filter can be adapted in the sub-band domain based on the average estimated noise power density spectrum $\hat{S}_{avg,bb}$ according to $$H_{eq,i}(e^{j\Omega_\mu}, n) =$$

$$\begin{cases} \max\{H_{min}, \min\{H_{max}, \Delta_{ink} H_{eq,i}(e^{j\Omega_\mu}, n-1)\}\}, & \text{if } \hat{S}_{avg,bb}(\Omega_\mu, n) > H_{eq,i}^2(e^{j\Omega_\mu}, n-1) \\ & \hat{S}_{b_i b_i}(\Omega_\mu, n), \\ \max\{H_{min}, \min\{H_{max}, \Delta_{dek} H_{eq,i}(e^{j\Omega_\mu}, n-1)\}\}, & \text{else.} \end{cases}$$

The correction factors have to satisfy the relation $0 \ll \Delta_{dek} < 1 < \Delta_{ink} \ll \infty$. The parameters $H_{max}$ and $H_{min}$ control maximum gain and maximum damping, respectively. Experiments have shown that 6 to 10 dB are suitable values for $H_{max}$ and −6 to −10 dB are suitable values for $H_{min}$. Thus, equalized sub-band microphone signals are obtained by the hands-free set according to $$Y_{eq,i}(e^{j\Omega_\mu}, n) = Y_i(e^{j\Omega_\mu}, n) H_{eq,i}(e^{j\Omega_\mu}, n).$$

Furthermore, the filter coefficients $H_{eq,i}(e^{j\Omega_\mu}, n)$ can be used to derive corresponding filter coefficients in the time domain to be used for equalization of the microphone signals in the in-vehicle communication system. In order not to introduce unacceptable time delay in the signal processing of the in-vehicle communication system an Infinite Impulse Response (IIR) filter, e.g., of the length of $N_{eq}$ equal to 5 to 10, may be used for equalization $$y_{eq,i}(n) = \left(y_i(n) - \sum_{l=1}^{N_{eq}} h_{eq,i,l}(n) y_i(n-l)\right) g_{eq,i}(n),$$

where both the IIR filter coefficients $h_{eq,i,l}(n)$ and the gain factors $g_{eq,i}(n)$ are derived from $H_{eq,i}(e^{j\Omega_\mu}, n)$ as it is described in the following.

The derivation is performed in a sub-sampled manner, e.g., only once to four times each second in order to save computational time. It is noted that the microphone signals $y_i(n)$ might be filtered for echo compensation/suppression before the equalization.

The vector of autocorrelation coefficients $$r_{eq,i}(n) = [r_{eq,i}(n,1), r_{eq,i}(n,2), \ldots, r_{eq,i}(n, N_{eq})]^T$$

(where the upper index indicates the transposition operation) as well as the matrix of autocorrelation coefficients $$R_{eq,i}(n) = \begin{bmatrix} r_{eq,i}(n, 0) & r_{eq,i}(n, 1) & \ldots & r_{eq,i}(n, N_{eq}-1) \\ r_{eq,i}(n, 1) & r_{eq,i}(n, 0) & \ldots & r_{eq,i}(n, N_{eq}-2) \\ \vdots & \vdots & \ddots & \vdots \\ r_{eq,i}(n, N_{eq}-1) & r_{eq,i}(n, N_{eq}-2) & \ldots & r_{eq,i}(n, 0) \end{bmatrix}$$

are formed of the autocorrelation coefficients $$r_{eq,i}(n, l) = \frac{1}{M} \sum_{\mu=0}^{M-1} \frac{e^{j\frac{2\pi}{M}\mu l}}{H_{eq,i}^2(e^{j\Omega_\mu}, n)}$$

with $l \in \{0, \ldots, N_{eq}\}$ and $$\Omega_\mu = \frac{2\pi}{M} \mu.$$

Here, M denotes the number of sub-bands of the analysis filter bank employed in the hands-free set in order to transform microphone signals into sub-band microphone signals.

The filter coefficients $h_{eq,i,l}(n)$ in the time domain used by the equalization filter of the in-vehicle communication system can be obtained from the vector and matrix of autocorrelation coefficients by $$[h_{eq,i,1}(n), h_{eq,i,2}(n), \ldots, h_{eq,i,N_{eq}}(n)]^T = R_{eq,i}^{-1}(n) r_{eq,i}(n).$$

The gain factors $g_{eq,i}(n)$ are obtained by $$g_{eq,i}(n) = \frac{1}{\sqrt{r_{eq,i}(n, 0) - \sum_{l=1}^{N_{eq}} h_{eq,i,l}(n) r_{eq,i}(n, l)}}.$$

Similarly, filter coefficients of an echo compensation filtering module used in the hands-free set can be used to calculate the corresponding filter coefficients in the time domain that can be used by an echo compensation filtering module provided in the in-vehicle communication system.

According to another example (see FIG. 4; this Figure shows the example shows an example similar to the one shown in FIG. 3 and including an echo compensation filtering module 29 and a module 30 for the detection of local speech activity), the processing in the hands-free set profits from the detection of speech activity due to an utterance of a passenger in the passenger compartment by the in-vehicle communication system. As soon as such a speech activity is detected adaptation of an echo compensation filtering module 29 and operation of background noise estimators of the hands-free set should be discontinued to avoid deteriorated signal quality due to some maladjustment. As already mentioned above, the processing in the time domain performed by the in-vehicle communication system is advantageous for the detection of speech activity, since no signal delay is introduced by analysis and synthesis filter banks.

Figure 4:
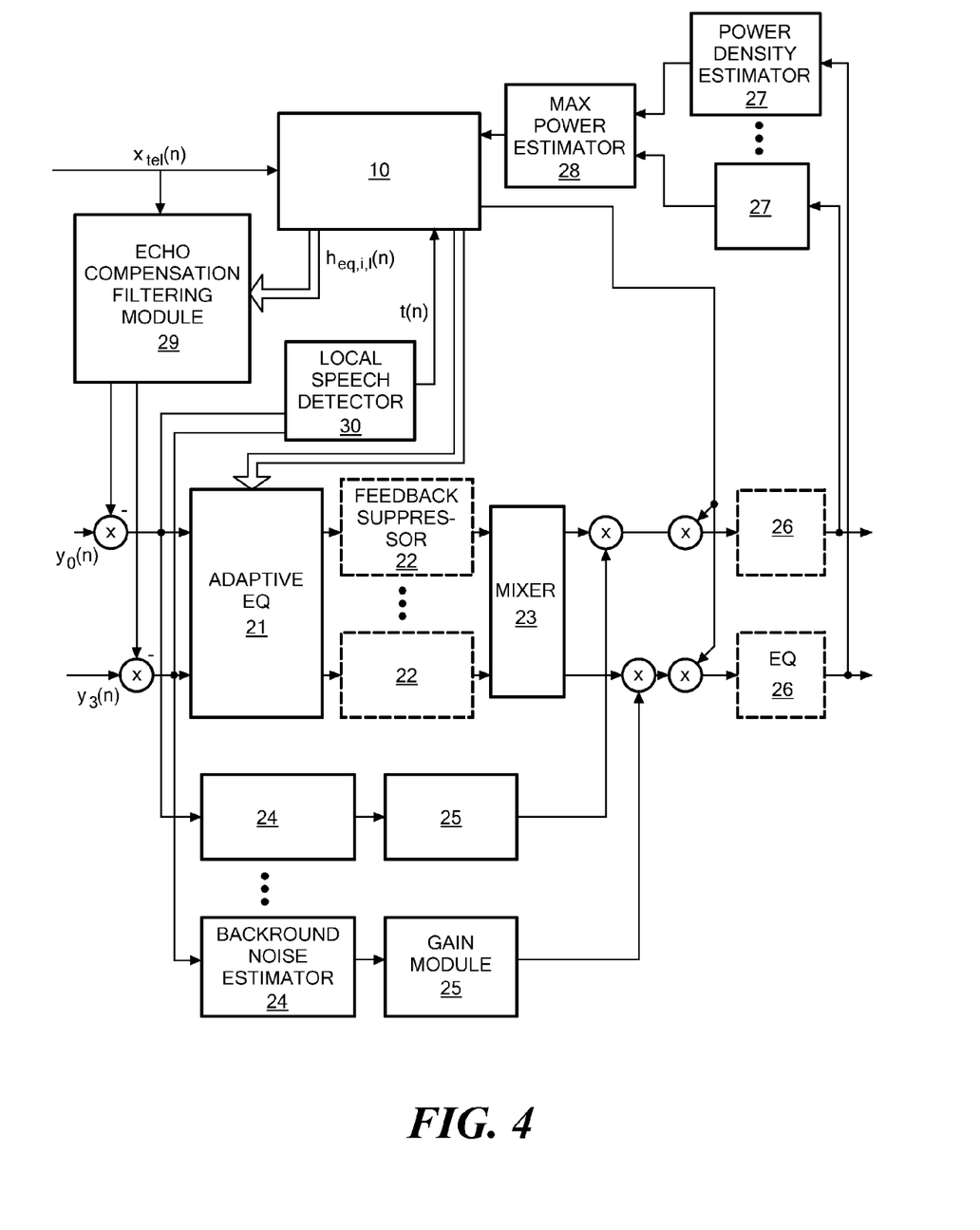
FIG. 4 illustrates an example of the simultaneous operation of a hands-free set installed in a vehicle and an in-vehicle communication system similar to the example shown in FIG. 3 including an echo compensation filtering module and a module for the detection of local speech activity.

For the detection of speech activity in the microphone signals $y_i(n)$ these signals are subject to echo compensation by the module 29 shown in FIG. 4

$$e_i(n) = \underbrace{y_i(n) - \sum_{l=0}^{N_{ec}} \hat{h}_{ec,i,l}(n) x_{tel}(n-l)}_{\hat{d}_i(n)}$$

where $N_{ec}$ is the length of the echo compensation filtering module 29 comprising the filter coefficients $\hat{h}_{ec,i,j}(n)$, and the resulting error signals are subject to short-time magnitude smoothing according to $$\overline{|e_i(n)|} = \lambda_{sd} \overline{|e_i(n-1)|} + (1-\lambda_{sd}) |e_i(n)|.$$

Suitably, the smoothing constant $\lambda_{sd}$ is chosen from the range from 0.9950 to 0.9995.

Furthermore, for each microphone channel the magnitude of the background noise is estimated. According to one example, this can be achieved by $$\overline{|b_i(n)|} = \min\{\overline{|e_i(n)|}, \overline{|b_i(n-1)|}\}(1+\epsilon)$$

with the positive real parameter $\epsilon \ll 1$. By the multiplication by $1+\epsilon$ it is avoided that the estimate becomes fixed to some minimum once it is reached. Based on a comparison of the magnitude of the short-time spectrum of the microphone signals with the corresponding estimated magnitude of the background noise it can be determined whether or not speech activity is present.

According to a more elaborated approach, the magnitude of estimated echo components is determined according to $$|\widehat{d_i(n)}| = \lambda_{sd}|\widehat{d_i(n-1)}| + (1-\lambda_{sd})|\hat{d}_i(n)|$$

with the same smoothing constant as used for the short-time magnitude smoothing of the error signal.

Detection of speech activity caused by a passenger in the passenger compartment can be determined by module 30 shown in FIG. 4 for each microphone channel according to $$t_i(n) = \begin{cases} 1, & \text{if } ((\overline{|e_i(n)|} > K_{sd}|\overline{b_i(n)}|) \wedge (\overline{|e_i(n)|} < K_{ab}|\overline{\hat{d}_i(n)}|)), \\ 0, & \text{else}. \end{cases}$$

Suitable choices for the constants are $K_{sd}$=8 ... 15 dB and $K_{ab}$=−15 ... −20 dB, respectively.

Detection of speech activity is completed by obtaining the maximum of the channels $$t(n) = \max_i \{t_i(n)\}$$

which is supplied to the hands-free set. Thereby, the hands-free set is informed about speech activity almost instantaneously and maladjustment of echo compensation filtering module, etc., caused by time-delayed detection of speech activity by the hands-free set itself can be prevented.

All previously discussed embodiments are not intended as limitations but serve as examples illustrating features and advantages of the invention. It is to be understood that some or all of the above described features can also be combined in different ways.

It should be recognized by one of ordinary skill in the art that the foregoing methodology may be performed in a signal processing system and that the signal processing system may include one or more processors for processing computer code representative of the foregoing described methodology. The computer code may be embodied on a tangible computer readable medium i.e. a computer program product.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In an embodiment of the present invention, predominantly all of the reordering logic may be implemented as a set of computer program instructions that is converted into a computer executable form, stored as such in a computer readable medium, and executed by a microprocessor within the array under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

We claim:

1. A signal processing system, comprising
 a plurality of microphones and loudspeakers;
 a hands-free set configured to receive a telephone signal from a remote party and to transmit a microphone signal supplied by at least one of the microphones to the remote party;
 an in-vehicle communication system configured to:
 receive the microphone signal supplied by at least one of the microphones;
 receive the telephone signal;
 amplify the microphone signal to obtain at least one first output signal;
 output the at least one first output signal and/or a second output signal corresponding to the telephone signal to at least one of the loudspeakers;
 wherein the signal processing system is configured to detect speech activity in the telephone signal and to control the in-vehicle communication system to reduce amplification of the microphone signal, if it is detected that speech activity is present in the telephone signal, wherein the hands-free set comprises an adaptive echo compensation filtering system and is configured to adapt the filter coefficients of the echo compensation filtering system only when the at least one first output signal output by the in-vehicle communication system is reduced to a predetermined level and wherein the in-vehicle communication system is configured to receive multiple microphone signals in multiple channels and to amplify the multiple microphone signals to obtain multiple first output signals and further comprising:
- a power estimating module configured to estimate the short-time power density of the multiple first output signals and to supply the maximum of the short-time power densities of the multiple first output signals to the hands-free set; and wherein
- the hands-free set is configured to determine whether the at least one first output signal output by the in-vehicle communication system is reduced to the predetermined level based on the maximum of the short-time power densities of the multiple first output signals.

2. A signal processing system, comprising
a plurality of microphones and loudspeakers;
a hands-free set configured to receive a telephone signal from a remote party and to transmit a microphone signal supplied by at least one of the microphones to the remote party;
an in-vehicle communication system configured to:
receive the microphone signal supplied by at least one of the microphones;
receive the telephone signal;
amplify the microphone signal to obtain at least one first output signal;
output the at least one first output signal and/or a second output signal corresponding to the telephone signal to at least one of the loudspeakers;
wherein the signal processing system is configured to detect speech activity in the telephone signal and to control the in-vehicle communication system to reduce amplification of the microphone signal, if it is detected that speech activity is present in the telephone signal
wherein
the hands-free set comprises:
a first equalization filter module configured to equalize microphone signals obtained by at least one of the number of microphones and input in the hands-free set and to adapt the filter coefficients of the first equalization filter module in the sub-band or Fourier domain; and
the in-vehicle communication system comprises a second equalization filtering module configured to equalize microphone signals input in the in-vehicle communication system and to adapt the filter coefficients of the second equalization filtering module in the time domain based on the adapted filter coefficients of the first equalization filtering module.

3. A signal processing system, comprising
a plurality of microphones and loudspeakers;
a hands-free set configured to receive a telephone signal from a remote party and to transmit a microphone signal supplied by at least one of the microphones to the remote party;
an in-vehicle communication system configured to:
receive the microphone signal supplied by at least one of the microphones;
receive the telephone signal;
amplify the microphone signal to obtain at least one first output signal;
output the at least one first output signal and/or a second output signal corresponding to the telephone signal to at least one of the loudspeakers;
wherein the signal processing system is configured to detect speech activity in the telephone signal and to control the in-vehicle communication system to reduce amplification of the microphone signal, if it is detected that speech activity is present in the telephone signal
wherein
the in-vehicle communication system is configured to process the microphone signal in the time domain; and
the hands-free set further comprises an analysis filter bank to obtain microphone sub-band signals or a Fourier transform module to obtain Fourier transformed microphone signals; and
wherein the in-vehicle communication system is configured to detect speech activity in microphone signals obtained by at least one of the number of microphones and input in the in-vehicle communication system by processing the microphone signals in the time domain; and
supply a signal to the hands-free set operating in the sub-band or Fourier domain that indicates speech activity or no speech activity.

4. The signal processing system according to claim 2, wherein
the hands-free set is configured to detect speech activity in the telephone signal and to supply a damping factor for reducing the amplification to the in-vehicle communication system, if it is detected that speech activity is present in the telephone signal.

5. A method for speech communication using a hands-free set and an in-vehicle communication system wherein both are installed in a passenger compartment, the method comprising:
receiving a telephone signal from a remote party by the hands-free set;
determining whether or not speech is present in the received telephone signal,
detecting an utterance of a passenger in the passenger compartment by at least one of a set of microphones installed in the passenger compartment to obtain a microphone signal;
processing the microphone signal by the in-vehicle communication system to obtain at least one first processed signal;
processing the telephone signal by the in-vehicle communication system or the hand-free set to obtain a second processed signal; and
outputting the at least one first and/or second processed signal to at least one loudspeaker installed in the passenger compartment;
wherein the processing of the microphone signal by the in-vehicle communication system comprises amplifying the microphone signal by a first gain factor when it is determined that no speech is present in the telephone signal and by a second gain factor smaller than the first gain factor when it is determined that speech is present in the telephone signal
wherein filter coefficients are only adapted when the at least one first processed signal is damped to a predetermined level with respect of the first gain factor.

6. The method according to claim 5, wherein the hands-free set and/or the in-vehicle communication system determines whether or not speech is present in the telephone signal and provides a damping factor and wherein the second gain factor is obtained on the basis of the first gain factor and the damping factor.

7. The method according to claim 5, wherein
the hands-free set comprises a first equalization filtering module configured to equalize microphone signals obtained by at least two of the set of microphones and input in the hands-free set;

the in-vehicle communication system comprises a second equalization filtering module configured to equalize microphone signals input in the in-vehicle communication system;

the method comprising the steps of:

adapting filter coefficients of the first equalization filtering module in the sub-band or Fourier domain; and adapting the filter coefficients of the second equalization filtering module in the time domain based on the adapted filter coefficients of the first equalization filtering module.

8. The method according to claims 5, further comprising:

detecting speech activity in microphone signals obtained by at least one of the set of microphones and input in the in-vehicle communication system by processing the microphone signals in the time domain by the in-vehicle communication system; and supplying a signal by the in-vehicle communication system to the hands-free set operating in the sub-band or Fourier domain that indicates speech activity or no speech activity present in the microphone signal in response to the step of speech detection.

9. The method according to claim 5, wherein the second gain factor is obtained based on the first gain factor and a damping factor and wherein the damping factor $g_{tel}(n)$ is determined by $$g_{tel}(n) = \begin{cases} \max\{g_{min}, g(n-1)g_{dek}\}, & \text{if } |\overline{x_{tel}(n)}| > \overline{x_0}, \\ \min\{1, g(n-1)g_{ink}\}, & \text{else,} \end{cases}$$

where $|\overline{x_{tel}(n)}|$ the short-time smoothed magnitude of the telephone signal $x_{tel}(n)$, $\overline{x_0}$ and $g_{min}$ denote a predetermined threshold and the maximum damping factor, respectively, and the relation $0 \ll g_{dek} < 1 < g_{ink} \ll \infty$ holds for the real factors $g_{dek}$ and $g_{ink}$.

10. A computer program product comprising a non-transitory computer readable medium having computer-executable instructions for speech communication using a hands-free set and an in-vehicle communication system wherein both are installed in a passenger compartment, the computer-executable instructions comprising:

computer code for receiving a telephone signal from a remote party by the hands-free set;

computer code for determining whether or not speech is present in the received telephone signal;

computer code for detecting an utterance of a passenger in the passenger compartment by at least one of a set of microphones installed in the passenger compartment to obtain a microphone signal;

computer code for processing the microphone signal by the in-vehicle communication system to obtain at least one first processed signal;

computer code for processing the telephone signal by the in-vehicle communication system or the hand-free set to obtain a second processed signal; and computer code for outputting the at least one first and/or second processed signal to at least one loudspeaker installed in the passenger compartment;

wherein the computer code for processing of the microphone signal by the in-vehicle communication system includes computer code for amplifying the microphone signal by a first gain factor when it is determined that no speech is present in the telephone signal and by a second gain factor smaller than the first gain factor when it is determined that speech is present in the telephone signal;

computer code for inputting the microphone signal in the hands-free set wherein the hands-free set includes an adaptive echo compensation filtering module;

computer code for echo compensating the microphone signal input in the hands-free set by the adaptive echo compensation filtering module; and computer code for transmitting the echo compensated microphone signal to the remote party;

wherein filter coefficients are only adapted when the at least one first processed signal is damped to a predetermined level with respect of the first gain factor.

11. A computer program product comprising a non-transitory computer readable medium having computer-executable instructions for speech communication using a hands-free set and an in-vehicle communication system wherein both are installed in a passenger compartment, the computer-executable instructions comprising:

computer code for receiving a telephone signal from a remote party by the hands-free set;

computer code for determining whether or not speech is present in the received telephone signal;

computer code for detecting an utterance of a passenger in the passenger compartment by at least one of a set of microphones installed in the passenger compartment to obtain a microphone signal;

computer code for processing the microphone signal by the in-vehicle communication system to obtain at least one first processed signal;

computer code for processing the telephone signal by the in-vehicle communication system or the hand-free set to obtain a second processed signal; and computer code for outputting the at least one first and/or second processed signal to at least one loudspeaker installed in the passenger compartment;

wherein the computer code for processing of the microphone signal by the in-vehicle communication system includes computer code for amplifying the microphone signal by a first gain factor when it is determined that no speech is present in the telephone signal and by a second gain factor smaller than the first gain factor when it is determined that speech is present in the telephone signal;

computer code for detecting speech activity in microphone signals obtained by at least one of the set of microphones and input in the in-vehicle communication system by processing the microphone signals in the time domain by the in-vehicle communication system; and computer code for supplying a signal by the in-vehicle communication system to the hands-free set operating in the sub-band or Fourier domain that indicates speech activity or no speech activity present in the microphone signal in response to the step of speech detection.

12. A computer program product comprising a non-transitory computer readable medium having computer-executable instructions for speech communication using a hands-free set and an in-vehicle communication system wherein both are installed in a passenger compartment, the computer-executable instructions comprising:

computer code for receiving a telephone signal from a remote party by the hands-free set;

computer code for determining whether or not speech is present in the received telephone signal;

computer code for detecting an utterance of a passenger in the passenger compartment by at least one of a set of microphones installed in the passenger compartment to obtain a microphone signal;

computer code for processing the microphone signal by the in-vehicle communication system to obtain at least one first processed signal;

computer code for processing the telephone signal by the in-vehicle communication system or the hand-free set to obtain a second processed signal; and computer code for outputting the at least one first and/or second processed signal to at least one loudspeaker installed in the passenger compartment;

wherein the computer code for processing of the microphone signal by the in-vehicle communication system includes computer code for amplifying the microphone signal by a first gain factor when it is determined that no speech is present in the telephone signal and by a second gain factor smaller than the first gain factor when it is determined that speech is present in the telephone signal;

wherein the second gain factor is obtained based on the first gain factor and a damping factor and wherein the damping factor $g_{tel}(n)$ is determined by $$g_{tel}(n) = \begin{cases} \max\{g_{min}, g(n-1)g_{dek}\}, & \text{if } |\overline{x_{tel}(n)}| > \overline{x_0}, \\ \min\{1, g(n-1)g_{ink}\}, & \text{else,} \end{cases}$$

where $|\overline{x_{tel}(n)}|$ is the short-time smoothed magnitude of the telephone signal $x_{tel}(n)$, $\overline{x}_0$ and $g_{min}$ denote a predetermined threshold and the maximum damping factor, respectively, and the relation $0 \ll g_{dek} < 1 < g_{ink} \ll \infty$ holds for the real factors $g_{dek}$ and $g_{ink}$.

* * * * *